Patented Dec. 2, 1952

2,620,261

UNITED STATES PATENT OFFICE 2,620,261

METHOD OF MAKING IRON OXIDE PIGMENT

Thomas Toxby, Holte, Denmark, assignor to C. K. Williams & Co., East St. Louis, Ill., a corporation of Delaware No Drawing. Application April 30, 1947, Serial No. 745,122

11 Claims. (Cl. 23—200)

The present invention relates to a method for the production of an iron oxide pigment and the product thereof. More particularly, the invention relates to a novel method for the production of an iron oxide pigment of controlled color in various shades of red and orange with improved transparency and brilliance together with superior fastness to light and to the product of the method.

The red and orange iron oxides include hematite, $Fe_2O_3$, with varying amounts of water dissolved in the lattice.

The so-called red iron oxide pigments are at the present time manufactured by three well-known methods, including (1) direct roasting of natural raw materials, (2) the calcination process consisting in calcining or roasting crystallized copperas ($FeSO_4$) and (3) the precipitation process, consisting in precipitating ferric hydroxide and roasting the precipitate to obtain red iron oxide.

The precipitation process may be varied to a considerable extent, by which varying results are obtained. One method employed is to precipitate a solution of a ferric salt with an alkali. Another method is to precipitate ferrous hydroxide in a solution of a ferrous salt, by means of ammonia, for example, and to oxidize the precipitate to the ferric state by passing a current of air through the suspension of the ferrous hydroxide. Another method, which is used for the production of a yellow iron oxide, involves contacting a solution of ferrous sulphate with iron scrap, by which the iron is slowly dissolved by passing a current of air through the solution at elevated temperatures usually about 60° C. The iron is dissolved as ferrous sulphate, which in the presence of air is oxidized to ferric sulphate, which in turn is continuously hydrolyzed and thereby precipitated in the form of the yellow pigment, $Fe_2O_3.1H_2O$, which in the trade is known as "Ferrite Yellow," or "Yellow Iron Oxide." This yellow pigment may be roasted at temperatures from about 300° C. to 700° C. to make a red iron oxide pigment.

Common to all these known methods for the production of red iron oxide particles involving precipitation is that the precipitate must be roasted in a separate step by subjecting the material to temperatures of at least 300° C.

The present invention is based on the discovery that hydrohematitic orange and red iron oxide pigments may be produced effectively in a period as short as twenty-four to forty-eight hours and may be made directly in the precipitation process without the roasting step or subjecting the material to the temperatures heretofore employed, thus avoiding the costly and troublesome roasting process heretofore used. By the use of the process as hereinafter described in detail, it is possible to obtain various hues of orange and red iron oxide and to control the process in a manner to obtain any predetermined or desired hue or color gradation between orange and red. Furthermore, by the method hereinafter described, it is possible to obtain iron oxide pigment of a particle size within a narrow controlled range, from the smallest size approaching colloidal dimensions to a large or coarse particle size. In the very small particle size range, it is possible by the method hereinafter described to produce red and orange pigments of high covering power and with qualities such as transparency and brilliance which has hitherto been obtainable only by means or organic pigments. The product of my method has, moreover, a vastly superior fastness to light as compared with red and orange organic pigments, and may be produced at a substantially lower cost than that involved in the production of organic pigments or lakes of the same color.

One of the objects of the invention is to provide a method for the production of an inorganic pigment of a red or orange hue and intermediate shades thereof without the use of dyes or other organic material and without the use of the usual costly roasting step.

Another object of the invention is to provide a method for the production of an iron oxide pigment having a red or orange color directly by a precipitation process without subjecting the pigment to the usual high roasting temperatures.

Another object of the invention is to provide a method for the production of iron oxide pigments of varying color or hue including red and orange together with intermediate or varying shades thereof without the use of dyes or other organic material, so as to produce a mineral pigment of superior fastness to light as compared with organic pigments or lakes.

Another object of the invention is to provide a method for the production of red and orange iron oxide pigments without the use of organic material, by which the particle size may be controlled within a relatively narrow range and in which pigments having a high covering power are produced.

Another object of the invention is to provide a method for the production of iron oxide pigments of a red and orange color and intermediate shades without the use of dyes or other organic material, with the production of a pigment having high transparency and brilliance comparable with that obtained by organic pigments or lakes.

Another object of the invention is to provide an inorganic pigment from an iron compound by an improved method of precipitation, by which controlled shades of color varying from red to orange may be produced at a relatively low cost.

With these and other objects in view, the invention comprises the various features hereinafter described and defined in the claims annexed hereto.

One method of my invention is based mainly on the precipitation of an iron hydroxide from a solution in the presence of a compound of zinc or copper which in the presence of ferrous salt ionizes to such an extent as to yield zinc or copper ions in the solution during the period of treatment. The iron hydroxide is precipitated in the presence of the zinc or copper compound by means of an alkali. If ferrous iron is present, it is necessary to provide for oxidation, which may be accomplished by the introduction of air into the solution or by the use of any suitable oxidizing agent, by which ferric hydroxide will be precipitated by means of the alkali. The solution is preferably subjected to a temperature of at least 65° C. for a period of from about 24 to 48 hours, although the period of treatment may be substantially longer if desired. During the heat treatment, the solution and suspension may be stirred in any desired manner or may be left quiescent during the period of treatment, in which the precipitate is formed.

In carrying out the invention, I may, for example, precipitate ferric hydroxide from a solution of a ferric salt by means of an alkali, as sodium hydroxide, or ammonium hydroxide, and the precipitate may be left in the solution in contact with a mixture of dissolved salts, including a ferrous salt and a zinc salt, or a ferrous salt and a copper salt, or a mixture of a ferrous salt, a zinc salt and a copper salt, the solution being maintained at an elevated temperature of at least 65° C., such as at 85° C., for example, for a period of time of about 24 to 48 hours, or longer if desired. During the heat treatment the solution may be stirred at intervals or continuously, or the solution and suspension may be maintained at the desired temperature for the required time of treatment without stirring, although in general the time required for the completion of the reaction is greater when the solution remains quiescent during the time of treatment. By means of this treatment, the color of the precipitated ferric hydroxide turns from the ordinary brown color to an orange color, and by continued treatment to a bright red hue. Upon completion of the reaction, the precipitate may be filtered off, or the solution may be decanted in order to separate the precipitate or pigment. The product of this treatment is found to be hydro-hematite.

The particle size of the pigment may be controlled within a substantially narrow range by the control of temperature and rate of stirring or the omission of stirring or agitation during the treatment. By increasing the rate of stirring during the treatment, the particle size becomes smaller, and by the omission of stirring or agitation, the particle size is increased. By the use of higher temperatures, also, the particles agglomerate and form larger size particles. The particle size may thus be controlled within relatively narrow limits.

In the above example, instead of carrying out the treatment in the presence of the original solution in which the ferric hydroxide is precipitated, the ferric hydroxide may first be separated from the solution and thereafter admixed with a solution of a ferrous salt together with a zinc salt or a copper salt, or in admixture with a ferrous salt and both a copper and a zinc salt, and the treatment being otherwise carried out in the manner above described.

It will be understood that if precipitated ferric hydroxide is treated in a solution of a ferrous salt in the manner above described, but without the addition of a zinc salt, or a copper salt, the yellow iron oxide is inevitably produced. It is believed, therefore, that the formation of the pigment in accordance with my invention is due in some manner to the effect of the presence of zinc ions or copper ions, or a combination of both zinc ions and copper ions, when compounds of both of these metals are employed in carrying out the invention. Moreover, the effect of the presence of zinc ions and copper ions with a ferrous salt appears to be unique in the production of iron oxide pigments of varying color between orange and red, since the effects have not been found with other metals or metal salts or compounds in the presence of ferric hydroxide and a ferrous salt. It appears, therefore, that the effect produced is due to the presence of a complex ion including zinc or copper with iron, or both zinc and copper with iron in the ferrous or ferric state.

There appears to be no definite limitations as to the composition of the mixed solutions above referred to, a mixture of 10 mols of a ferrous salt with 1 mol of a zinc salt being operative to produce the result, as well as a mixture of 1 mol of a ferrous salt with 10 mols of a zinc salt, but it is essential that both components be present to produce the iron oxide pigment in colors varying from orange to red in accordance with the above method.

During the heat treatment in the process of my invention, the lower limit for the temperature is about 65° C., but higher temperatures may be employed up to the boiling point of the solution under atmospheric pressure to obtain the desired results. The method may also be carried out under superatmospheric pressure, as in an autoclave, for example, in which substantially higher temperatures may be employed, such as 150° C., or higher.

As another example of the mode of carrying out the invention, I may employ a solution containing a mixture of a ferrous salt and a zinc compound, and immerse therein metallic iron, then oxidizing the iron while immersed in the solution by passing air into the solution while the temperature is maintained preferably between 80° C. and 90° C., by which a ferric salt and ferric hydrate are formed, and in which the ferric salt reacts with the metallic iron to form a ferrous salt so that ferrous ions and zinc ions are continuously present during the heat treatment which results in the formation of a red iron oxide precipitate. If desired, a copper compound may be used in place of the zinc compound, by which copper ions would be present with the ferrous ions in the solution and a different shade of the red iron oxide precipitate would thereby be produced. The result obtained is attributable to mixtures of ferrous ions with zinc ions or copper ions, and appears to be independent of the nature of the accompanying anion. It is found, however, that the nature of the anion, as the sulphate, chloride, nitrate, or other anion, does have an effect on the particle size distribution in conjunction with the temperature of treatment and the time of treatment, and the anion employed may be accordingly selected to obtain the desired result or predetermined particle size. In general, I prefer to employ a zinc compound or copper compound which is easily soluble in water, although substantially any compound may be employed which in the presence of the solution will yield zinc ions or copper ions, such, for example, as zinc oxide, zinc phosphate and various compounds of copper which are not readily soluble.

As another example of the mode of carrying out the invention, I may employ the following:

About 200 grams of ferric chloride, $FeCl_3.6H_2O$, is dissolved in about 4,000 cubic centimeters of water, and brown ferric hydroxide is then precipitated at room temperature by adding about 600 cubic centimeters of concentrated ammonia. The ferric hydroxide precipitate is then washed by decantation with water, and is then dispersed in a solution of ferrous sulphate and cupric sulphate of such concentration that the final dispersion is 0.36 molar with respect to ferrous sulphate, and 0.12 molar with respect to cupric sulphate. The dispersion is then heated to a temperature of about 85° C. and maintained at this temperature thermostatically for about 48 hours in a closed container in order to avoid evaporation losses. By this treatment, the color or hue of the dispersion turns from a dark brown to a bright terra cotta red. The solution is then filtered to separate the precipitate which may then be washed and dried in the usual manner. The resulting bright terra cotta red pigment is rather transparent but is of high covering power and color strength, and the color is permanent. The pigment produced consists mainly of ferric oxide with about 8% of water in solid solution in the lattice.

In the above example, if cupric sulphate were entirely omitted, and the process carried out otherwise in the manner described, the color of the dispersion would turn from a dark brown to a muddy yellow and the pigment consists mainly of $Fe_2O_3.H_2O$. This experiment clearly illustrates the effect of the omission of the cupric sulphate in the above example, but is not to be considered as within the scope of the invention as hereinafter defined in the claims annexed hereto.

In the above example, I may substitute zinc sulphate for the cupric sulphate in the same molar concentration, that is, the solution may be 0.12 molar with respect to the zinc sulphate. The final product is similar to that produced by the use of cupric sulphate, the pigment being a terra cotta red in color.

As another example of the mode of carrying out the invention, I may employ a solution which is 0.025 molar with respect to ferric sulphate, 0.10 molar with respect to ferrous sulphate, and 0.05 molar with respect to zinc sulphate. This solution is heated to about 80° C. and is then precipitated with caustic soda, NaOH, in an amount corresponding to the amount of ferric sulphate present in the solution. A dark brown dispersion is formed which is then maintained at a temperature of 80° C. by means of a thermostat for a period of 48 hours, by which the color of the dispersion changes to a bright red. The precipitate may then be removed from the solution in the same manner as above described to produce the dry pigment.

Another method of carrying out the invention is to use iron scrap, which is placed in a solution in a tank which is 0.20 molar with respect to ferrous chloride and 0.10 molar with respect to zinc chloride. The solution is then heated and air is passed through the solution while the temperature of the solution is maintained at about 85° C. Ferric hydroxide is then added to the solution, the ferric hydroxide being produced, for example, by precipitating a solution of 0.10 molar ferric chloride with a corresponding amount of 0.5 molar sodium hydroxide solution. The characteristics of the final pigment which is produced is dependent upon the amount of precipitated ferric hydroxide which is added, but an amount corresponding to 3.5 kilograms of ferric chloride per 1,000 kilograms of solution produces a good average product. The suspension of the ferric hydroxide in the solution in contact with the iron is now maintained at a uniform temperature of at least 65° C., and preferably at a temperature of 85° C., while air is passed through the solution in order to oxidize ferrous iron to ferric iron. By this treatment the color of the precipitate changes from a yellow brown to a terra cotta red after about 6 to 8 hours, and as the treatment is continued, the color of the precipitate turns a deeper and deeper red. It will be understood that during the process, as described, the iron scrap is continually being dissolved and oxidized to the ferric state and then precipitated, by which in the process, the red iron oxide is finally produced. When the desired color has been obtained, the process is discontinued and the precipitate or pigment is separated from the solution, washed and then dried in the known manner. This method may be similarly carried out by substituting ferrous sulphate and zinc sulphate in place of the chlorides by which the final product is a red iron oxide similar to that obtained by the use of the chlorides. In the above example, it was found that by the omission of the zinc chloride or zinc sulphate, the result was an entirely different one in that a dark yellow iron oxide was obtained instead of the red iron oxides above described. It is apparent, therefore, that the presence of the zinc compound, or the zinc ion in the solution produced a substantially different result as to the color and character of the pigment produced.

It will be understood that the terms and expressions herein employed are intended as terms of description and not of limitation, and there is no intention in the use of such terms and expressions of excluding any equivalents in the process described. It is recognized also that a wide variation of the examples above set forth is possible within the scope of the invention as defined in the claims annexed hereto.

Having thus described the invention, what is claimed as new is:

1. A method for the production of hydrohematitic iron oxide pigments having a hexagonal rhombohedral crystal structure containing not more than 8% chemically combined water, in the form of dry powder of hues varying from orange to red comprising, forming an aqueous mass containing (1) brown precipitated ferric hydroxide and, in solution, both (2) a ferrous salt and (3) a catalyst which is an ionizable compound of a metal selected from the group consisting of zinc and copper, said catalyst being present in a ratio of at least one mol to 10 mols of ferrous salt present maintaining the mass at a temperature of at least 65° C. until a hydro-hematitic iron oxide of a hue within the said color range is obtained, separating the said oxide from the liquid of the mass containing the catalyst and removing the free surface moisture from the said oxide by drying, thereby directly providing a pigment of the indicated color without resort to roasting.

2. A method for the production of hydro-hematitic iron oxide pigments having a hexagonal rhombohedral crystal structure containing not more than 8% chemically combined water, in the form of dry powder of hues varying from orange to red comprising, precipitating brown ferric hydroxide by adding an alkali to an aqueous solution of a ferric salt, forming an aqueous mass containing in solution (1) a ferrous salt, (2) a catalyst which is a salt of a metal selected from the group consisting of zinc and copper and (3) said ferric hydroxide precipitate, said catalyst being present in a ratio of at least one mol to 10 mols of ferrous salt present, maintaining the mass at a temperature of at least 65° C. until a hydro-hematitic iron oxide of a hue within the said color range is obtained, separating the said oxide from the liquid of the mass containing the catalyst and removing the free surface moisture from the said oxide by drying, thereby directly providing a pigment of the indicated color without resort to roasting.

3. A method for the production of hydro-hematitic iron oxide pigments having a hexagonal rhombohedral crystal structure containing not more than 8% chemically combined water, in the form of dry powder of hues varying from orange to red comprising, adding an alkali to an aqueous solution of a brown ferric salt thereby precipitating ferric hydroxide, separating the ferric hydroxide precipitate formed from the liquid of the reaction mass, mixing said ferric hydroxide with an aqueous mass containing in solution (1) both a ferrous salt and (2) a catalyst which is a salt of a metal selected from the group consisting of zinc and copper and also containing (3) metallic iron, the molar ratio of the catalyst to the ferrous salt present being at least 1 to 10, maintaining the mass at a temperature of from 65° C. up to the boiling point of the liquid mass at atmospheric pressure while introducing air until a hydro-hematitic iron oxide of a hue within the said color range is obtained, separating the said oxide from the liquid of the mass containing the catalyst and removing the free surface moisture from the said oxide by drying, thereby directly providing a pigment of the indicated color without resort to roasting.

4. A method for the production of hydro-hematitic iron oxide pigments having a hexagonal rhombohedral crystal structure containing not more than 8% chemically combined water, in the form of dry powder of hues varying from orange to red comprising, forming an aqueous mass containing in solution (1) a ferrous salt, (2) a ferric salt, and (3) a catalyst which is a salt of a metal selected from the group consisting of zinc and copper, said catalyst being present in a ratio of at least one mol to 10 mols of ferrous salt present precipitating the ferric iron in said solution by adding thereto an alkali in an amount corresponding substantially to the equivalent of the ferric salt present therein thereby forming a dark brown dispersion in the liquid mass, maintaining the mass at a temperature of at least 65° C. until a hydro-hematitic iron oxide of a hue within the said color range is obtained, separating the said oxide from the liquid of the mass containing the catalyst and removing the free surface moisture from the said oxide by drying, thereby directly providing a pigment of the indicated color without resort to roasting.

5. A method for the production of hydro-hematitic iron oxide pigments having a hexagonal rhombohedral crystal structure containing not more than 8% chemically combined water, in the form of dry powder of hues varying from orange to red comprising, forming an aqueous mass containing (1) metallic iron and, in solution, both (2) a ferrous salt and (3) a catalyst which is a salt of a metal selected from the group consisting of zinc and copper, said catalyst being present in a ratio of at least one mol to 10 mols of ferrous salt present, heating the mass and maintaining its temperature at a level of at least 65° C., introducing air into the mass during said heating thereby oxidizing the ferrous iron to the ferric hydroxide state, discontinuing the reaction when the hydro-hematitic iron oxide of a hue within the said color range has formed, separating the said oxide from the liquid of the mass containing the catalyst and removing the free surface moisture from the said oxide by drying, thereby directly providing a pigment of the indicated color without resort to roasting.

6. A method for the production of hydro-hematitic iron oxide pigments having a hexagonal rhombohedral crystal structure containing not more than 8% chemically combined water, in the form of dry powder of hues varying from orange to red comprising, forming an aqueous mass containing (1) metallic iron (2) brown precipitated ferric hydroxide and, in solution, both (3) a ferrous salt and (4) a catalyst which is an ionizable compound of a metal selected from the group consisting of zinc and copper, said catalyst being present in a ratio of at least one mol to 10 mols of ferrous salt present, heating the mass and maintaining its temperature at a level of at least 65° C. in the presence of an oxidizing agent thereby oxidizing to the ferric hydroxide state the ferrous iron content initially present and also ferrous iron formed by the combination of the metallic iron present with the acid ions liberated by said oxidation, discontinuing the reaction when the hydro-hematitic iron oxide of a hue within the said color range has formed and separating the said oxide from the liquid of the mass containing the catalyst and removing the free surface moisture from the said oxide by drying, thereby directly providing a pigment of the indicated color without resort to roasting.

7. A method for the production of hydro-hematitic iron oxide pigments having a hexagonal rhombohedral crystal structure containing not more than 8% chemically combined water, in the form of dry powder of hues varying from orange to red comprising, forming an aqueous mass containing (1) metallic iron and, in solution, both (2) a ferrous salt and (3) a catalyst which is a salt of a metal selected from the group consisting of zinc and copper, said catalyst being present in a ratio of at least one mol to 10 mols of ferrous salt present, heating the mass and introducing air until ferric hydrate has been formed in the solution, adding (4) brown precipitated ferric hydroxide to the mass, heating the mass and maintaining its temperature at a level of from about 65° C. up to the boiling point of the liquid at atmospheric pressure, introducing air into the mass during said heating thereby oxidizing ferrous iron already present and that formed during the reaction to the ferric hydroxide state, discontinuing the reaction when the hydro-hematitic iron oxide of a hue within the said color range has formed, separating the said oxide from the liquid of the mass containing the catalyst and removing the free surface moisture from the said oxide by drying, thereby directly providing a pigment of the indicated color without resort to roasting.

8. A method for the production of hydro-hematitic iron oxide pigments having a hexagonal rhombohedral crystal structure containing not more than 8% chemically combined water, in the form of dry powder of hues varying from orange to red comprising, forming an aqueous mass containing (1) metallic iron and, in solution, (2) both a ferrous salt and (3) a catalyst which is a salt of a metal selected from the group consisting of zinc and copper, the catalyst being present in a molar ratio of at least 1 to 10 of the ferrous solution heating the mass and maintaining its temperature at a level of from about 65° C. up to the boiling point of the liquid mass at atmospheric pressure for a period of at most forty-eight hours, introducing air into the mass during said heating thereby oxidizing the ferrous iron initially present and that formed during the reaction and thereby forming initially a brown precipitate, discontinuing the reaction when a hydro-hematitic iron oxide of a hue within the said color range is obtained, separating the said oxide from the liquid of the mass containing the catalyst and removing the free surface moisture from the said oxide by drying, thereby directly providing a pigment of the indicated color without resort to roasting.

9. A method for the production of hydro-hematitic iron oxide pigments having a hexagonal rhombohedral crystal structure containing not more than 8% chemically combined water, in the form of dry powder of hues varying from orange to red comprising, heating an aqueous mass containing in solution, (1) a water-solublue ferrous salt and (2) a catalyst which is a readily soluble salt of zinc, said zinc salt being present in a ratio of at least one mol to ten mols of ferrous salt present and said mass containing also (3) brown precipitated ferric hydroxide and (4) metallic iron, maintaining said mass at a temperature above 65° C. while introducing air thereby oxidizing the ferrous salt already present and that formed from the metallic iron during the reaction, discontinuing the reaction when the hydro-hematitic iron oxide of a hue within the said color range has formed, separating the said oxide from the liquid of the mass containing the catalyst and removing the free surface moisture from the said oxide by drying, thereby directly providing a pigment of the indicated color without resort to roasting.

10. A method for the production of hydro-hematitic iron oxide pigments having a hexagonal rhombohedral crystal structure containing not more than 8% chemically combined water, in the form of dry powder of hues varying from orange to red comprising, forming an aqueous mass containing (1) metallic iron and, in solution, both (2) a ferrous salt and (3) a catalyst which is an ionizable compound of zinc, said catalyst being present in a ratio of at least one mol to ten mols of ferrous salt present, adding (4) brown precipitated ferric hydroxide to the mass, heating the mass and maintaining its temperature at a level of from about 65° C. up to the boiling point of the liquid at atmospheric pressure, introducing air into the mass during said heating thereby oxidizing ferrous iron already present and that formed during the reaction, discontinuing the reaction when the hydro-hematitic iron oxide of a hue within the said color range has formed, separating the said oxide from the liquid of the mass containing the catalyst and removing the free surface moisture from the said oxide by drying, thereby directly providing a pigment of the indicated color without resort to roasting.

11. A method for the production of hydro-hematitic iron oxide pigments having a hexagonal rhombohedral crystal structure containing not more than 8% chemically combined water, in the form of dry powder of hues varying from orange to red comprising, heating an aqueous mass containing in solution, (1) a water-soluble ferrous salt and (2) a catalyst which is an ionizable compound of zinc, said catalyst being present in a ratio of at least one mol to ten mols of ferrous salt present, and said mass containing also (3) brown precipitated ferric hydroxide and (4) metallic iron, maintaining said mass at a temperature above about 80° C. while introducing air thereby oxidizing the ferrous salt already present and that formed from the metallic iron during the reaction, discontinuing the reaction when the hydro-hematitic iron oxide of a hue within the said color range has formed, separating the said oxide from the liquid of the mass containing the catalyst and removing the free surface moisture from the said oxide by drying, thereby directly providing a pigment of the indicated color without resort to roasting.

THOMAS TOXBY.

REFERENCES CITED

The following references are of record in the file of this patent:

UNITED STATES PATENTS

| Number | Name | Date |
|---|---|---|
| 234,595 | Macay | Nov. 16, 1880 |
| 691,324 | Ramage | Jan. 14, 1902 |
| 997,237 | Carrick et al. | July 4, 1911 |
| 1,327,061 | Penniman et al. | Jan. 6, 1920 |
| 1,368,748 | Penniman et al. | Feb. 15, 1921 |
| 1,392,925 | Fireman | Oct. 11, 1921 |
| 1,501,873 | Tyrer | July 15, 1924 |
| 1,596,363 | McMillan | Aug. 17, 1926 |
| 1,840,326 | Ott et al. | Jan. 12, 1932 |
| 2,127,907 | Fireman | Aug. 23, 1938 |
| 2,388,659 | Ryan | Nov. 6, 1945 |

FOREIGN PATENTS

| Number | Country | Date |
|---|---|---|
| 13,722 | Great Britain | of 1884 |
| 1,882 | Great Britain | of 1892 |
| 4,712 | Great Britain | of 1900 |

OTHER REFERENCES

Mellor, "Comprehensive Treatise on Inorganic and Theoretical Chemistry," vol. 13, pages 832, 838, 875, 878. Longmans, Green and Co., N. Y. C. 1934.